(12) United States Patent
Blanc

(10) Patent No.: US 6,388,403 B2
(45) Date of Patent: May 14, 2002

(54) PROCESS AND DEVICE FOR COLOR ADJUSTMENT OF A COLOR MONITOR

(75) Inventor: Jean-Pierre Blanc, Theys (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/770,760

(22) Filed: Jan. 25, 2001

(30) Foreign Application Priority Data

Feb. 15, 2000 (FR) .............................................. 0001817

(51) Int. Cl.[7] .................................................. G09G 1/04
(52) U.S. Cl. ........................... 315/381; 315/383; 315/3; 345/150; 345/77; 348/673
(58) Field of Search ....................... 315/368.11, 368.12, 315/368.13, 370, 381, 383, 3; 345/22, 20, 77, 150, 178, 186; 348/655, 658, 673, 679; 358/455, 504, 518, 521

(56) References Cited

U.S. PATENT DOCUMENTS 5,452,019 A * 9/1995 Fukuda et al. .............. 348/655
5,489,996 A * 2/1996 Oku et al. ................... 358/518
5,619,229 A 4/1997 Kumaki ...................... 345/150
5,714,842 A * 2/1998 Krause et al. ................. 315/1

FOREIGN PATENT DOCUMENTS

EP 0957631 11/1999

* cited by examiner

Primary Examiner—Haissa Philogene
(74) Attorney, Agent, or Firm—Lisa K. Jorgenson; Allen, Dyer, Doppelt, Milbrath & Gilchrist, P.A.

(57) ABSTRACT

A process for color adjustment of a color monitor including a cathode-ray tube and a brightness adjustment module includes providing a nominal brightness signal downstream of a white level adjustment module for adjusting a white level and upstream of a black level adjustment module for adjusting a black level. The process also includes setting a voltage required to obtain a black color image, setting a voltage required to obtain a white color image, providing the nominal brightness signal upstream of the white level adjustment module, and setting the voltage required to obtain the black color image.

34 Claims, 3 Drawing Sheets

PROCESS AND DEVICE FOR COLOR ADJUSTMENT OF A COLOR MONITOR

FIELD OF THE INVENTION

The present invention relates to the field of color monitors or video screens, and, more particularly, to color monitors for computers.

BACKGROUND OF THE INVENTION

Each visible image on a color monitor includes three color cues, namely red, green and blue. In the case of a color monitor for a computer, these three color cues originate from the computer and are sent to a pre-amplifier to be set and controlled. The color cues are then sent to an amplifier and are finally directed to the three cathodes of the cathode-ray tube of the monitor. The pre-amplifier and the amplifier are generally arranged in the same framework as the cathode-ray tube.

The final factory calibration of the monitor includes two fundamental adjustments. The first is the black adjustment (also referred to as the "cut-off" adjustment). This adjustment involves setting, for each pathway (i.e., for each color) the voltage required at the output of the amplifier or of the pre-amplifier to have a black color image. The second adjustment is the white adjustment (also referred to as the "drive" adjustment) which involves adjusting, for each pathway, the voltage required at the output of the pre-amplifier to have a white color image. A nominal white to be displayed on the screen includes a defined proportion of the three base colors (i.e., red, green and blue) and is measured by an appropriate apparatus, such as a color camera placed in front of the monitor.

The behavior of the cathode-ray tube is not identical for the three pathways, and the above two adjustments are aimed at compensating for the differences in the tube from one pathway to another. Moreover, the behavior of a given pathway varies from one tube to another, which requires individual adjustment upon leaving the manufacturing line.

The user of the monitor benefits from a so-called "brightness" adjustment, which enables him to set the luminosity level of the screen as a function of the ambient lighting or of the content of the image to be displayed. The brightness adjustment is made either using a thumbwheel placed on the framework of the monitor or by clicking on a brightness adjustment menu with the computer's mouse, for example.

Presently, two amplifier and pre-amplifier architectures are known. The first, which is simple and economical, includes placing a brightness adjustment in the pre-amplifier after the white adjustment. The voltage corresponding to the brightness cue, which is the same for the three pathways, is not affected by the white adjustment. It follows that the proportionality between the three pathways which is set by the white adjustment and is effected for a nominal value of the brightness adjustment will not be preserved if the brightness adjustment is modified by the user. This results in a modification of the characteristics of the white color when the brightness is set by the user. This architecture exhibits a factory adjustment procedure which is easy to implement since the two adjustments (i.e., black and white) are independent. The quality of the image is not, however, entirely satisfactory.

The second known architecture includes placing a brightness adjustment in the pre-amplifier ahead of the white adjustment. Thus, the voltage corresponding to the brightness cue is modified by the white adjustment and the proportionality between the three pathways is maintained irrespective of the value of the brightness adjustment. This results in better visual comfort for the user since-the original white color established for a nominal brightness signal will always be preserved.

Unfortunately, this architecture has the drawback of being difficult to implement during factory adjustment since the initial adjustment of the black is modified by the adjustment of the white. Consequently, the adjustment of the black must be repeated once the adjustment of the white has been made and so on. Definitive adjustment is achieved after several iterations, this resulting in a non-negligible time loss during fine-tuning in the factory. This time loss is typically on the order of about ten seconds. This results in an increase in manufacturing costs and increased complexity of the manufacturing line.

SUMMARY OF THE INVENTION

An object of the present invention is to provide a process and a device for color adjustment of a color monitor which is economical, simple, and can yield a high quality image.

This and other objects, features, and advantages according to the invention are provided by a process for the color adjustment of a color monitor including a cathode-ray tube and a circuit or means for adjusting the brightness. The process includes providing a nominal brightness signal downstream of a circuit or means for adjusting the white level and upstream of a circuit or means for adjusting the black level. Furthermore, a voltage required to obtain a black color image is set and the voltage required to obtain a white color image is set. The nominal brightness signal may be provided upstream of the means for adjusting the white level. Also, the voltage required to obtain a black color image is set.

Preferably, the cathode-ray tube is provided with a plurality of pathways, and the settings are effected for each of the pathways. The voltage setting required to obtain a black color image may be made at an output of an amplifier included in the monitor. Additionally, the voltage setting required to obtain a black color image may be made at an output of a pre-amplifier included in the monitor. Further, the voltage setting required to obtain a white color image may be made at the output of the pre-amplifier. The color of the image is also preferably measured.

A device according to the present invention for color adjustment of a color monitor including a cathode-ray tube includes means for adjusting the brightness, a means for setting the voltage required to obtain a black color image, and a means for setting the voltage required to obtain a white color image. The device may further include means for adjusting the brightness upstream of the means for setting the voltage required to obtain a white color image and means for adjusting the brightness downstream of the means for setting the voltage required to obtain a white color image.

Advantageously, the device may include a single means for adjusting the brightness that is able to be active alternately upstream and downstream of the means for setting the voltage required to obtain a white color image. The device may also include switching means at an output of the means for adjusting the brightness for connecting the output of the means for adjusting the brightness alternately to an input and to an output of the means for setting the voltage required to obtain a white color image. A monitor is also provided according to another embodiment of the present invention comprising an adjustment device such as that described above.

According to the invention, the steps for calibrating a color monitor at the end of the production line have a duration of around 1 to 2 seconds, as compared to the duration of adjustment required for the first architecture of the prior art noted above. Furthermore, this is done while preserving the initial adjustment of the white color, irrespective of the brightness selected by a user of the monitor.

The present invention therefore makes it possible to obtain the advantages of each of the prior art architectures without suffering from their respective drawbacks. Moreover, the video amplification architecture in accordance with the invention remains relatively simple in that it adds a switching means which is common for the three pathways. The adjustment device according to the invention is therefore simple and relatively economical.

BRIEF DESCRIPTION OF THE DRAWINGS

The present invention will be better understood and other advantages will become apparent upon reading the detailed description of an embodiment provided by way of non-limitative example and illustrated by the appended drawings in which.

DETAILED DESCRIPTION OF THE PREFERRED EMBODIMENTS

Figure 1:
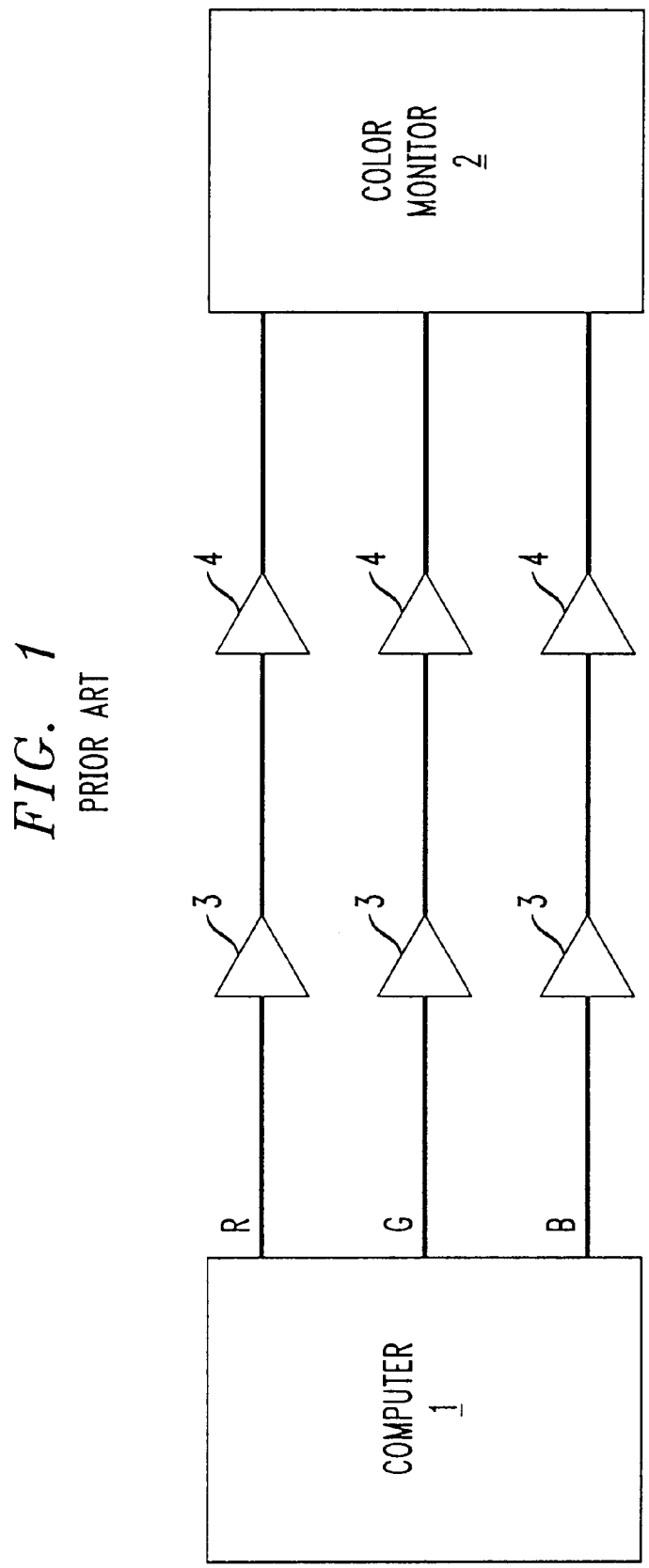
FIG. 1 is a schematic diagram of the general architecture of a computer equipped with a color monitor.

Turning now to FIG. 1, a microcomputer 1 is linked to a color monitor 2 by three pathways which are conventionally denoted by the letters R, G, B respectively corresponding to the colors red, green and blue. Arranged on each of the pathways R, G, B are a pre-amplifier 3 and an amplifier 4. By way of example, the pre-amplifier 3 may have an adjustable gain on the order of 6 to 8 and is supplied with a DC voltage. The DC voltage is generally between 8 and 12 volts, for example. Each amplifier 4 has an input connected to an output of the pre-amplifier 3 of the corresponding pathway and an output linked to a corresponding cathode of the monitor 2. The amplifier 4 is also supplied with a DC voltage, generally between 80 and 120 volts.

The pre-amplifiers 3 and the amplifiers 4 are provided with other inputs (not shown in FIG. 1) which allow the necessary calibrations in view of the manufacturing scatter of the monitors and, for a given monitor, of each of its cathodes. These calibrations make it possible to obtain a reference black level and white level on the monitor 2. Other inputs for adjusting the contrast and the brightness are also provided. The contrast and the brightness are generally adjusted by the user himself and are common to the three pathways. On the other hand, the black level and white level adjustments must be tailored to each pathway.

One pre-amplifier 3 per pathway and one amplifier 4 per pathway are illustratively shown in FIG. 1. However, it would also be possible to have a single pre-amplifier common to three pathways with three inputs and three outputs, and a single amplifier common to the three pathways with three inputs and three outputs other than the calibration or adjustment inputs noted above.

Figure 2:
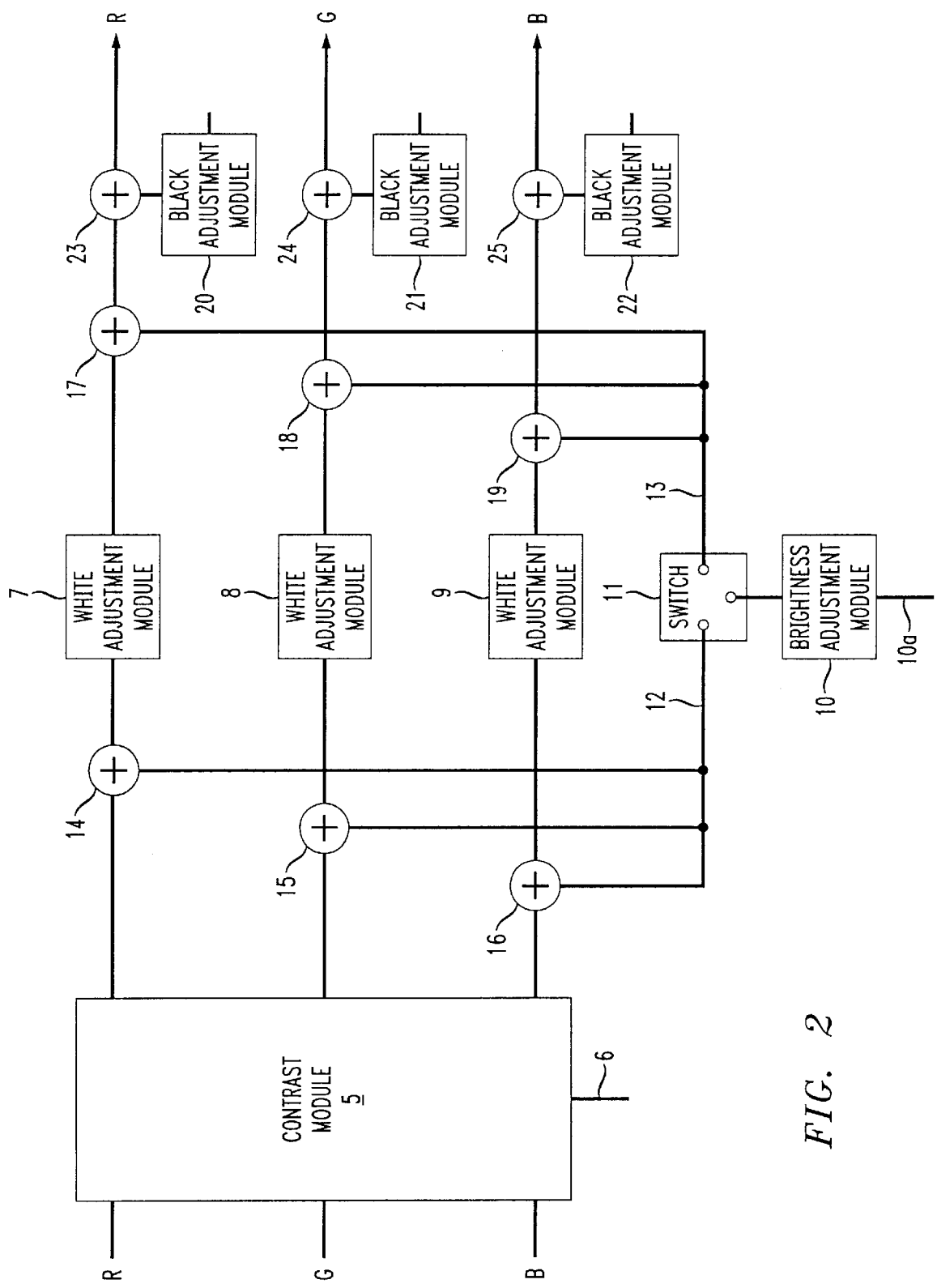
FIG. 2 is schematic diagram of an adjustment device in accordance with the invention.

As may be seen in FIG. 2, the signals of the three pathways R, G, B at the output of a computer are sent to a contrast module 5 common to the three pathways. The contrast module 5 is provided with a control input 6 for receiving a control signal originating from control means. The control means formulates the control signal using hardware (e.g., a contrast adjustment button (not shown) that is available to the user) or software (e.g., a contrast adjustment icon which can be pointed at using a mouse).

At the output of the contrast module 5, each pathway R, G, B is connected to a corresponding white adjustment module 7, 8, 9. A brightness adjustment module 10 has a control input 10a which may be controlled in a manner similar to the contrast module 5. The output of the brightness module 10 is connected to a switch 11, preferably embodied in integrated fashion and provided with two outputs 12, 13. The switch 11 is able to electrically link the output of the brightness module 10 either with its output 12 or with its output 13. The switch 11 also has a control input (not shown) for receiving a control signal that determines the electrical link to be made.

The output 12 of the switch 11 is connected in parallel to three adders 14, 15, 16 arranged on the R, G and B pathways, respectively, between the contrast module 5 and the respective white adjustment modules 7, 8, 9. Similarly, the output 13 of the switch 11 is connected in parallel fashion to three adders 17, 18, 19 arranged on the R, G and B pathways, respectively, at the respective outputs of the white adjustment modules 7, 8, 9.

Further provided are three black adjustment modules 20, 21, 22, one per pathway, and each has a control input and an output. The outputs are connected to adders 23, 24, 25 respectively arranged on the R, G and B pathways downstream of the adders 17, 18, 19.

The outputs of the adders 23, 24, 25 are connected either directly to the cathodes of the monitor 2 or to the amplifiers 4 of the monitor 2 (see FIG. 1). Specifically, the black adjustment modules 20–22 can form part of either a pre-amplifier or an amplifier. Generally, the white adjustment modules 7–9 form part of a pre-amplifier.

The manner of operation of such a device is as follows. At the output of a manufacturing line in the factory, calibration is performed by operating the switch 11 in such a way that it connects the output of the brightness module 10 to its output 13. Thus, the brightness signal is injected downstream of the white modules 7–9. A calibration of the black level is then performed by the black adjustment modules 20–22 for predetermined nominal contrast and brightness levels. During this calibration, the monitor is of course on checked by a color camera (not shown) which makes it possible to measure the various color components displayed on the screen. A DC voltage is therefore set for each pathway and is respectively injected by the adders 23–25 onto each pathway R, G and B so that a nominal black level is observed on the screen of the monitor.

In a next step, the switch 11 is kept in the same position and an adjustment of the nominal white level is made by the white adjustment modules 7–9. To make the white adjustment, a gauged signal of 0.7 Vpic (provided by an apparatus referred to as a "color test card") corresponding to a white image is sent to the three R, G, B inputs of the respective pre-amplifiers 3. Stated otherwise, one sets the voltage level which must be added to that which makes it possible to obtain the nominal black level to obtain a nominal white level observed by the color camera on the screen of the monitor.

In a next step, the position of the switch 11 is changed, isolating its output 13 and electrically linking the output of the brightness module 10 and the output 12. The nominal brightness signal is therefore injected upstream of the white adjustment modules 7–9. To make the black adjustment, a signal of 0 Vpic (corresponding to a black image) is sent to the R, G, B inputs. A new adjustment of the nominal black is then made by the black adjustment modules 20–22. This is done because the black level observed on the screen has been modified by the injection of the nominal brightness signal upstream, rather than downstream, of the white adjustment modules 7–9. The calibration of the colors is terminated here and it is not necessary to repeat the adjustment of the white level which has not been modified and which is preserved irrespective of the brightness value desired. Thus, with just three calibration steps one obtains a satisfactory result without subsequently modifying the white color displayed on the screen during the use thereof.

Figure 3:
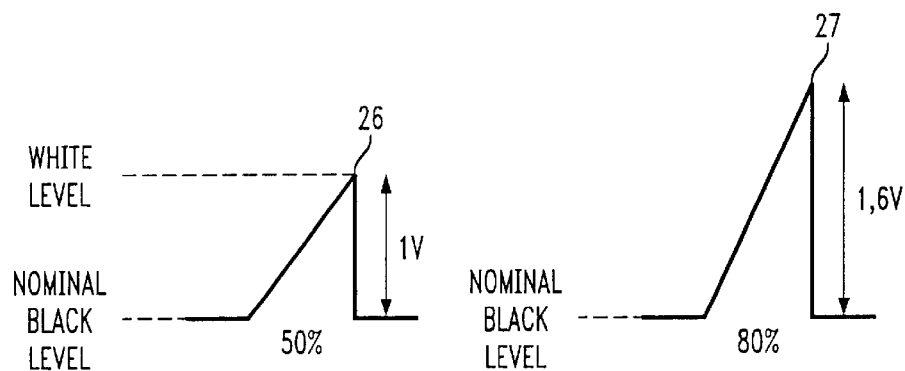
FIGS. 3–5 are waveform diagrams of a video signal during first, second, and third steps, respectively, of a process according to an embodiment of the invention.

Turning now to FIG. 3, signals 26, 27 which are emitted on separate pathways at the input of a monitor at the end of the second step described above are illustratively shown. That is, the signals are illustrated after the first step of adjusting the black and the second step of adjusting the white before switching the switch 11. The nominal level of the black corresponds to a certain voltage and the nominal level of the white to a higher voltage, where the difference between these two voltages is not identical between the pathways. For example, there may be 1 volt on the signal 26 and 1.6 volts on the signal 27. The white adjustment module is adjusted to 50% for the signal 26 and to 80% for the signal 27.

Figure 4:
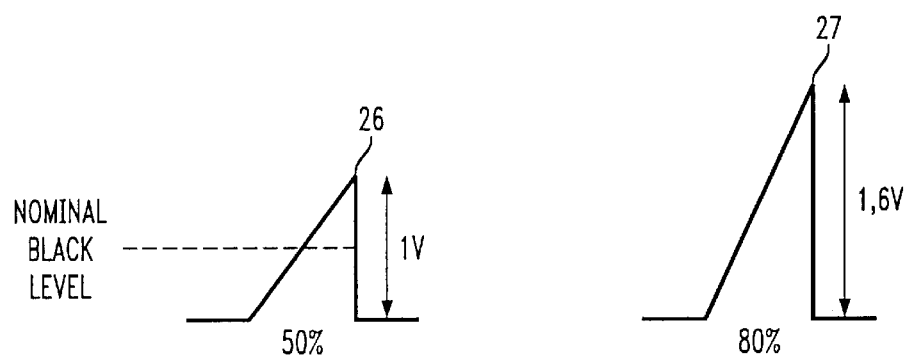
Figure 5:
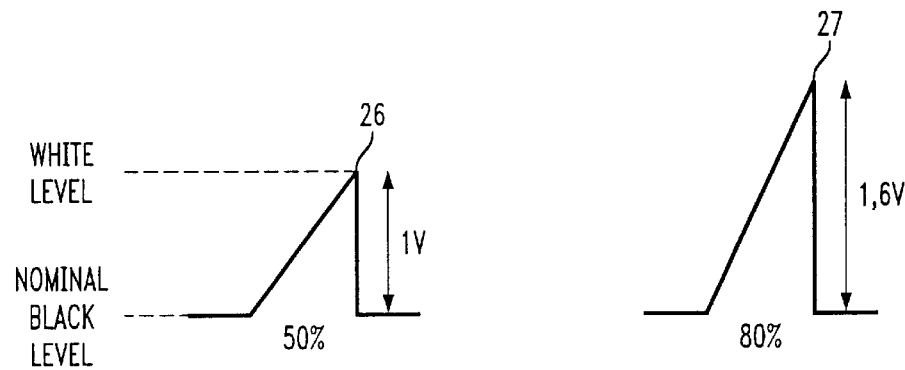

After switching the switch 11, the signals are in a state illustrated in FIG. 4. The coefficient of 50% of the white adjustment module which processes the signal 26 has therefore been applied to the signal 26. This causes it to shift downwards by a value equal to 50% of the nominal black level. The signal 27 has been shifted downwards by a value corresponding to 20% of the nominal black level, given the coefficient of 80% applied by its white adjustment module. The third step of adjusting the black level makes it possible to re-establish a satisfactory signal, as illustrated in FIG. 5. For each pathway, a black adjustment module 20, 21, 22 (see FIG. 2) makes it possible to add the voltage required for the signal obtained to be equal to the desired black level as observed on the screen of the monitor by the calibration line equipped with a camera.

The invention makes it possible to obtain fast and therefore economical calibration of a video monitor at the end of a manufacturing line. Furthermore, this may be done by including in the preamplifier/amplifier assembly of the monitor a relatively simple electronic means or switch, which makes it possible to inject a brightness signal upstream or downstream of the various white adjustment modules.

Thus, as compared with the first architecture according to the prior art discussed above, the invention makes it possible at comparable device cost and comparable calibration method cost to obtain an image of improved quality on the monitor. As compared with the second architecture according to the prior art noted above, the invention makes it possible, for constant image quality, to considerably reduce the duration of calibration, again reducing manufacturing costs.

That which is claimed is:

1. A method for adjusting color of an image on a color monitor comprising a cathode-ray tube and a brightness adjustment module, the method comprising:
providing a nominal brightness signal downstream of a white level adjustment module for adjusting a white level of the image and upstream of a black level adjustment module for adjusting a black level of the image;
setting a voltage required to obtain a black color image;
setting a voltage required to obtain a white color image;
providing the nominal brightness signal upstream of the white level adjustment module; and
setting the voltage required to obtain the black color image.

2. The method according to claim 1 wherein the cathode-ray tube comprises a plurality of pathways; and wherein each of the setting steps comprises setting a voltage for each of the pathways.

3. The method according to claim 1 wherein the color monitor further comprises an amplifier upstream from the cathode-ray tube; and wherein the voltage required to obtain a black color image is set at an output of the amplifier.

4. The method according to claim 1 wherein the color monitor further comprises a pre-amplifier upstream from the cathode-ray tube; and wherein the voltage required to obtain a black color image is set at an output of the pre-amplifier.

5. The method according to claim 1 wherein the color monitor further comprises a pre-amplifier upstream from the cathode-ray tube; and wherein the voltage required to obtain a white color image is set at an output of the pre-amplifier.

6. The method according to claim 1 further comprising measuring the color of the image.

7. A method for adjusting color of an image on a color monitor comprising:
adjusting a brightness of the image upstream of at least one white adjustment module for adjusting a white level of the image;
setting a level required to obtain a black color image;
setting a level required to obtain a white color image; and
adjusting the brightness of the image downstream of the at least one white adjustment module.

8. The method according to claim 7 further comprising adjusting the brightness of the image upstream of at least one black level adjustment module for adjusting a black level of the image.

9. The method according to claim 7 wherein the cathode-ray tube comprises a plurality of pathways; and wherein each of the setting steps comprises setting a level for each of the pathways.

10. The method according to claim 7 wherein the color monitor further comprises an amplifier upstream from the cathode-ray tube; and wherein the level required to obtain a black color image is set at an output of the amplifier.

11. The method according to claim 7 wherein the color monitor further comprises a pre-amplifier upstream from the cathode-ray tube; and wherein the level required to obtain a black color image is set at an output of the pre-amplifier.

12. The method according to claim 7 wherein the color monitor further comprises a pre-amplifier upstream from the cathode-ray tube; and wherein the level required to obtain a white color image is set at an output of the pre-amplifier.

13. The method according to claim 7 further comprising measuring the color of the image.

14. A device for adjusting color of an image on a color monitor comprising:
at least one black adjustment module for setting a level required to obtain a black color image;
at least one white adjustment module for setting a level required to obtain a white color image;
an upstream brightness adjustment module portion for adjusting the brightness of the image upstream of the at least one white adjustment module; and a downstream brightness adjustment module portion for adjusting the brightness of the image downstream of the at least one white adjustment module.

15. The device according to claim 14 wherein said upstream and downstream brightness adjustment module portions are implemented in a single brightness adjustment module which alternately adjusts the brightness of the image upstream and downstream of said at least one white adjustment module.

16. The device according to claim 15 further comprising a switch for alternately connecting an output of said single brightness adjustment module to an input and to an output of said at least one white adjustment module.

17. The device according to claim 14 wherein the cathode-ray tube comprises a plurality of pathways; wherein said at least one white adjustment module sets a level for each pathway required to obtain a white color image; and wherein said at least one black adjustment module sets a level for each pathway required to obtain a black color image.

18. The device according to claim 14 wherein the color monitor further comprises an amplifier upstream from the cathode-ray tube; and wherein said at least one black adjustment module sets the level required to obtain a black color image at an output of the amplifier.

19. The device according to claim 14 wherein the color monitor further comprises a pre-amplifier upstream from the cathode-ray tube; and wherein said at least one black adjustment module sets the level required to obtain a black color image at an output of the pre-amplifier.

20. The device according to claim 14 wherein the color monitor further comprises a pre-amplifier upstream from the cathode-ray tube; and wherein said at least one white adjustment module sets the level required to obtain a white color image at an output of the pre-amplifier.

21. A device for adjusting color of an image on a color monitor comprising:
at least one black adjustment module for setting a level required to obtain a black color image;
at least one white adjustment module for setting a level required to obtain a white color image; and
at least one brightness adjustment module for adjusting the brightness of the image upstream and downstream of the at least one white adjustment module.

22. The device according to claim 21 wherein said at least one brightness adjustment module alternately adjusts the brightness of the image upstream and downstream of said at least one white adjustment module.

23. The device according to claim 22 further comprising a switch for alternately connecting an output of said at least one brightness adjustment module to an input and to an output of said at least one white adjustment module.

24. The device according to claim 21 wherein the cathode-ray tube comprises a plurality of pathways; wherein said at least one white adjustment module sets a level for each pathway required to obtain a white color image; and wherein said at least one black adjustment module sets a level for each pathway required to obtain a black color image.

25. The device according to claim 21 wherein the color monitor further comprises an amplifier upstream from the cathode-ray tube; and wherein said at least one black adjustment module sets the level required to obtain a black color image at an output of the amplifier.

26. The device according to claim 21 wherein the color monitor further comprises a pre-amplifier upstream from the cathode-ray tube; and wherein said at least one black adjustment module sets the level required to obtain a black color image at an output of the pre-amplifier.

27. The device according to claim 21 wherein the color monitor further comprises a pre-amplifier upstream from the cathode-ray tube; and wherein said at least one white adjustment module sets the level required to obtain a white color image at an output of the pre-amplifier.

28. A color monitor for displaying a color image comprising:
a cathode-ray tube for generating the color image;
at least one black adjustment module for setting a level required to obtain a black color image;
at least one white adjustment module for setting a level required to obtain a white color image; and
at least one brightness adjustment module for adjusting the brightness of the image upstream and downstream of the at least one white adjustment module.

29. The color monitor according to claim 28 wherein said at least one brightness adjustment module alternately adjusts the brightness of the image upstream and downstream of said at least one white adjustment module.

30. The color monitor according to claim 29 further comprising a switch for alternately connecting an output of said at least one brightness adjustment module to an input and to an output of said at least one white adjustment module.

31. The color monitor according to claim 28 wherein said cathode-ray tube comprises a plurality of pathways; wherein said at least one white adjustment module sets a level for each pathway required to obtain a white color image; and wherein said at least one black adjustment module sets a level for each pathway required to obtain a black color image.

32. The color monitor according to claim 28 further comprising an amplifier upstream from said cathode-ray tube; and wherein said at least one black adjustment module sets the level required to obtain a black color image at an output of said amplifier.

33. The color monitor according to claim 28 further comprising a pre-amplifier upstream from said cathode-ray tube; and wherein said at least one black adjustment module sets the level required to obtain a black color image at an output of said pre-amplifier.

34. The color monitor according to claim 28 further comprising a pre-amplifier upstream from said cathode-ray tube; and wherein said at least one white adjustment module sets the level required to obtain a white color image at an output of said pre-amplifier.

* * * * *